(12) United States Patent
Holland

(10) Patent No.: US 8,816,262 B2
(45) Date of Patent: Aug. 26, 2014

(54) AUTO-CALIBRATION METHOD FOR REAL-TIME AGRICULTURAL SENSORS

(76) Inventor: Kyle H. Holland, Lincoln, NE (US)

( * ) Notice: Subject to any disclaimer, the term of this patent is extended or adjusted under 35 U.S.C. 154(b) by 509 days.

(21) Appl. No.: 13/248,523

(22) Filed: Sep. 29, 2011

(65) Prior Publication Data

US 2012/0016517 A1    Jan. 19, 2012

Related U.S. Application Data

(63) Continuation-in-part of application No. 12/815,721, filed on Jun. 15, 2010, now Pat. No. 8,558,157, which is a continuation of application No. 12/167,706, filed on Jul. 3, 2008, now Pat. No. 7,723,660.

(60) Provisional application No. 60/958,330, filed on Jul. 3, 2007.

(51) Int. Cl.
   *G01C 21/02*    (2006.01)
   *G01C 21/24*    (2006.01)

(52) U.S. Cl.
   USPC ............... 250/206.1; 382/110; 702/2; 702/5

(58) Field of Classification Search
   USPC .................. 250/206.1; 382/110; 702/2, 5
   See application file for complete search history.

(56) References Cited

U.S. PATENT DOCUMENTS

| | | | |
|---|---|---|---|
| 3,443,072 A | 5/1969 | Gibbs | |
| 3,910,701 A | 10/1975 | Henderson et al. | |
| 4,055,768 A | 10/1977 | Bromberg | |
| 4,369,886 A | 1/1983 | Lane et al. | |
| 4,518,253 A | 5/1985 | Takahashi | |
| 4,628,454 A | 12/1986 | Ito | |
| 4,630,773 A | 12/1986 | Ortlip | |
| 4,926,170 A | 5/1990 | Beggs et al. | |
| 4,986,665 A | 1/1991 | Yamanishi et al. | |
| 5,025,150 A | 6/1991 | Oldham et al. | |
| 5,144,767 A | 9/1992 | McCloy et al. | |
| 5,220,876 A | 6/1993 | Monson et al. | |
| 5,296,702 A | 3/1994 | Beck et al. | |
| 5,355,815 A | 10/1994 | Monson | |
| 5,389,781 A | 2/1995 | Beck | |
| 5,585,626 A | 12/1996 | Beck et al. | |
| 5,763,873 A | 6/1998 | Beck et al. | |
| 5,789,741 A | 8/1998 | Kinter | |
| 5,809,440 A | 9/1998 | Beck et al. | |
| 5,833,144 A | 11/1998 | Kinter | |
| 5,837,997 A | 11/1998 | Beck | |
| 6,160,902 A | 12/2000 | Dickson et al. | |
| 6,393,927 B1 | 5/2002 | Biggs et al. | |

(Continued)

OTHER PUBLICATIONS

Aronson, Milton H., "Low-Level Measurements-8 Lock-in and Carrier Amplifiers", Measurements and Data Corporation, pp. C1-C15.

(Continued)

*Primary Examiner* — Seung C Sohn
(74) *Attorney, Agent, or Firm* — McKee, Voorhees & Sease

(57) ABSTRACT

A method for application of an agricultural product to a field is provided. The method includes acquiring real-time sampled data using real-time agricultural sensors, auto-calibrating the real-time agricultural sensors using statistical characteristics of the real-time sampled data to determine an application rate, and applying the agricultural product to the field based on the application rate. The step of auto-calibrating can be performed in various ways depending upon the type of agricultural product, the data available from the agricultural sensors or otherwise, or otherwise.

27 Claims, 13 Drawing Sheets

(56) References Cited

U.S. PATENT DOCUMENTS

| | | |
|---|---|---|
| 6,529,615 B2 | 3/2003 | Hendrickson et al. |
| 6,596,996 B1 | 7/2003 | Stone et al. |
| 6,601,341 B2 | 8/2003 | Raun et al. |
| 6,889,620 B2 | 5/2005 | Fraisse et al. |
| 6,963,881 B2 | 11/2005 | Pickett et al. |
| 6,999,877 B1 | 2/2006 | Dyer et al. |
| 7,047,133 B1 | 5/2006 | Dyer et al. |
| 7,049,597 B2 | 5/2006 | Bodkin |
| 7,058,197 B1 | 6/2006 | McGuire et al. |
| 7,171,912 B2 | 2/2007 | Fraisse et al. |
| 7,188,450 B2 | 3/2007 | Raun et al. |
| 7,723,660 B2 | 5/2010 | Holland |
| 8,135,178 B2 | 3/2012 | Hendrickson et al. |
| 2001/0036295 A1 | 11/2001 | Hendrickson et al. |
| 2004/0119020 A1 | 6/2004 | Bodkin |

OTHER PUBLICATIONS

Burr-Brown, Applications Handbook. OPT201 Photodiode amplfier rejects ambient light. 1994. AB-061, p. 379.

Gage, S. Evans et al., Optoelectronics Applications Manual, 1977. McGraw-Hill Book Co.

Haggar, R.J. et al., "A Prototype Hand-Held Patch Sprayer for Killing Weeds, Activated by Spectral Difference in Crop/Weed Canopies", Agricultural Research Counsel, Nov. 15, 1982, pp. 349-358.

Haggar, R.J. et al., "Measuring Spectral Differences in Vegetation Canopies by a Reflectance Ratio Meter", Weed Research, 1984 vol. 24, pp. 59-65.

Hooper, A. W. et al., "A Photoelectric Sensor for Distinguishing between Plant Material and Soil" J. Agric. Engng. Res. (1976) 21, pp. 145-155.

Hyder, Dave, "Infrared Sensing and Data Transmission Fundamentals", Industrial Control Applications, Mar. 1991, DL412/D, AN1016, pp. 367-372.

Knipling, E.B., "Physical and Physiological Basis for the Visible and Near-Infrared Radiation from Vegetation", American Elsevier Publishing Company, Inc. 1970, pp. 155-159.

McAbe, D., "An Eye on Nitrogen", Precision AG, Mar. 2004, pp. 21-23.

McAbe, D., "Seeing the Light of Nitrogen", Nebraska Farmer, Feb. 1996, pp. 14, 15 and 20.

Motorola "Linear/Interface Devices", MC3346 and MC3373 Datasheets, 1988, pp. 9-42 to 9-46.

Palmer, J. et al., "Automatic Control of Sugar Beet Singling and Thinning by Means of an On-line Digital Computer", J. Agric. Eng. Res., (1971) vol. 16 (2), pp. 107-125.

Ritchie, J.C. et al., "Airborne laser measurements of rangeland canopy cover and distribution", J. Range Manage, Mar. 1992, 45:189-193.

Rsichenberger, Larry, "Tools With Eyes", Farm Journal, Mar. 1989, pp. 16-18.

Searcy, S. W. et al., "Measurement of Agricultural Field Location Using Microwave Frequency Triangulation" Computers and Electronics in Agriculture (1990), vol. 4, pp. 209-233.

Stafford, J. V. et al., "A Portable Infra-red Moisture Meter for Agricultural and Food Materials: Part 1, Instrument Development", J. Agric. Eng. Res. (1989), 43:45-46.

Stone, Marvin L. et al., Application of J1939 Networks in Agricultural Equipment, Oklahoma State University Dearborn Group, Stillwater, Oklahoma Farmington Hills, Michigan, http://biosystems.okstate.edu/home/mstone/ag.J1939.htm.

Thompson, J.F. et al., "Potential for Automatic Weed Detection and Selective Herbicide Application", Crop Protection (1991), vol. 10, p. 254-259.

Girma, Kefyalew et al., "Nitrogen Accumulation in Shoots as a Function of Growth Stage of Corn and Winter Wheat", Journal of Plant Nutrition, Dec. 1, 2010, 34:2, 165-182.

Hodgen, P. J. et al., "Relationship Between Response Indices Measured In-Season and at Harvest in Winter Wheat", Journal of Plant Nutrition, 2005, 28: 221-235.

Holland, K. H. et al., "Derivation of a Variable Rate Nitrogen Application Model for In-Season Fertilization of Corn", Agronomy Journal, 2010, vol. 102, Issue 5, pp. 1415-1424.

Raun, William R. et al., "Independence of yield potential and crop nitrogen response" Precision Agri., Oct. 2, 2010, DOI 10.1007/s11119-010-9196-z; Springer Science+Business Media, LLC, 2010.

Raun, William R. et al., "Chapter 10—Temporally and Spatially Dependent Nitrogen Management for Diverse Environments" c10.indd, Jan. 22, 2009, pp. 203-214.

Shanahan, J.F. et al., "Responsive in-season nitrogen management for cereals", Computers and Electronics in Agriculture 61 (2008) pp. 51-62.

AUTO-CALIBRATION METHOD FOR REAL-TIME AGRICULTURAL SENSORS

RELATED APPLICATIONS

This application is a Continuation-in-Part Application of U.S. Ser. No. 12/815,721, filed on Jun. 15, 2010, which is a Continuation Application of U.S. Ser. No. 12/167,706 filed Jul. 3, 2008, now U.S. Pat. No. 7,723,660 issued May 25, 2010, which claimed priority to U.S. Ser. No. 60/958,330 filed on Jul. 3, 2007, all of which are hereby incorporated by reference in their entirety.

FIELD OF THE INVENTION

The present invention relates to variable rate material management for agricultural landscapes. More particularly, but not exclusively, the present invention relates to auto-calibration of real-time sensors used in the application of agricultural products such as agrochemicals and seeds.

BACKGROUND OF THE ART

Various methodologies are available to crop producers which allow them to apply agrochemicals. Some methodologies use real-time active crop or soil sensors for variable rate control of agrochemicals and seed rate. Yet problems remain in providing effective calibration of these sensors.

What is needed are systems and methods which are simple and convenient for agricultural producers to use while still resulting in application of agrochemicals and agricultural materials in acceptable and desirable manners.

SUMMARY OF THE INVENTION

Therefore, it is a primary object, feature, or advantage of the present invention to improve over the state of the art.

It is a further object, feature, or advantage of the present invention to provide for methods and systems for application of agrochemicals and agricultural materials which use real-time sensors to assist in the application of the agrochemicals and agricultural materials.

It is a still further object, feature, or advantage of the present invention to provide for methods and systems for application of agrochemicals which do not require the use of crop reference strips or regions for calibration purposes.

Another object, feature, or advantage of the present invention is to provide for methods and systems for applications of agrochemicals which allow for users to select the methodology or algorithms to be used.

Yet another object, feature, or advantage of the present invention is to allow a crop producer to variably control rate of application of agrochemicals without driving through at least a portion of the field for calibration purposes.

A still further object, feature, or advantage of the present invention is to use adaptive algorithms for variably controlling the rate of application of agrochemicals within a field.

A further object, feature, or advantage of the present invention is to provide for variable rate control which does not require the use of GPS data.

A still further object, feature, or advantage of the present invention is to provide for variable rate control methodologies which may be used with remote sensing as well as real-time active sensors.

A still further object, feature, or advantage of the present invention is to provide for variable rate control methodologies which may be used with electromagnetic, conductivity, chemical, tilt, topology and force real-time sensors.

A still further object, feature, or advantage of the present invention is to provide for best management practice implementation based on data produced by real-time sensor and variable rate control methodologies which may be used with electromagnetic, optical, conductivity, chemical, tilt, topology and force real-time sensors.

A still further object, feature, or advantage of the present invention is to provide for plant selection via data collected by sensors (electromagnetic, optical, conductivity, chemical, tilt, topology and force real-time sensors) for the purpose of selecting plants based on genetic trait or vigor characteristic selection. Information can be processed either in real-time or post processed.

One or more of these and/or other objects, features, or advantages will become apparent from the specification and claims that follow. No single embodiment of the present invention need exhibit each or any of the objects, features, or advantages and different embodiments may have different objects, features, or advantages. The present invention is not to be limited by or to these objects, features, or advantages.

The present invention provides several methods for practicing sensor-based precision farming techniques pertaining to the application of materials such as seeds, fertilizer, pesticides, herbicides or other agricultural substances. The present invention does not require a highly fertilized reference area (or controlled agrochemical region whether it be treated with a high or low dose of material) to calibrate the sensing system for application of an agrochemical and thereby eliminates the extra management steps and overhead required by the producer to create, locate and maintain these portions of a field. Additionally, the methodologies disclosed hereafter are not limited to real-time active sensors but may also be applied to other remote sensing technologies such as aerial and satellite imaging.

According to one aspect of the present invention, a method for application of an agricultural product to a field is provided. The method includes acquiring real-time sampled data using real-time agricultural sensors, auto-calibrating the real-time agricultural sensors using statistical characteristics of the real-time sampled data to determine an application rate, and applying the agricultural product to the field based on the application rate. The step of auto-calibrating can be performed in various ways depending upon the type of agricultural product, the data available from the agricultural sensors or otherwise, or otherwise.

According to another aspect of the present invention, an apparatus for application of an agricultural product to a field is provided. The apparatus includes one or more real-time agricultural sensors, and a control unit in operative communication with the plurality of real-time agricultural sensors, the control unit configured to perform steps of (a) acquiring real-time sampled data using the real-time agricultural sensors, (b) auto-calibrating the real-time agricultural sensors using statistical characteristics of the real-time sampled data to determine an application rate, and (c) applying the agricultural product to the field based on the application rate.

According to another aspect of the present invention, a method is provided. The method includes acquiring real-time sample data with agriculture sensors, auto-calibrating the agriculture sensors using an auto-calibrate engine to determine an application rate, applying agricultural product at the application rate; maintaining location data associated with the real-time sample data and the application rate data and identifying locations in which plants exhibit characteristics of interest after application of the agricultural product.

According to another aspect of the present invention, a method provides for acquiring sample data with agriculture sensors traveling through a field, the sample data having location data associated therewith and analyzing the sample data using statistical characteristics to determine plants within the field having characteristics of interest. The sample data may be analyzed with a histogram method. The plants of interest may be associated with vegetation index values of interest.

BRIEF DESCRIPTION OF THE DRAWINGS

FIG. 2A illustrates sensor measurement. FIG. 2B to 2E were generated from soil samples along the measurement transect. The soil sensor was calibrated to the field's average organic matter content. Note, NPK measurements roughly tract sensor measurements whereas field elevation does not.

DETAILED DESCRIPTION

Figure 1:
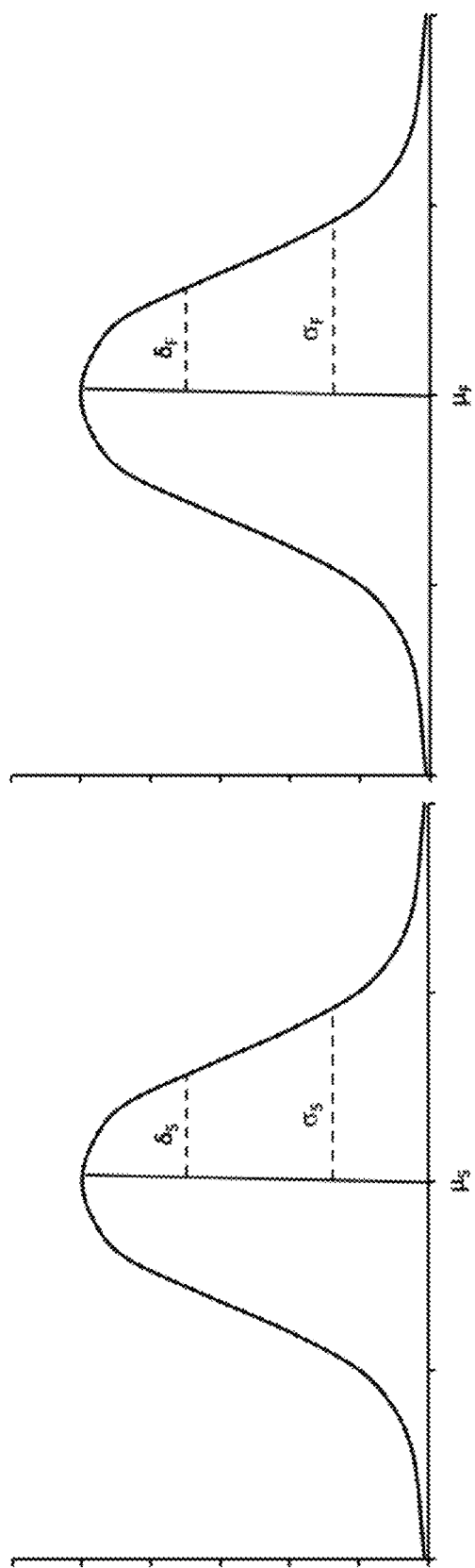
FIG. 1 illustrates data distributions of sampled sensor data and the true field parameter distribution.

The methodology relies on the statistical relationships between sampled sensor data and field parameter distributions. Normally the distributions are not known at the time of agrochemical application. The sampled sensor data can take the form of crop, soil, topology or combinations of the aforementioned. Various sensing technologies may be utilized to gather this data in real-time such as active crop canopy sensors, conductivity sensor, electrochemical sensors, soil color sensor, or other types of sensors or combinations of sensors. It is assumed that general shape of the physical field parameter distribution (spatial variation) is similar and relative to the sampled sensor distribution, see FIG. 1. The sampled sensor distribution can be created for real-time analysis by utilizing histograms or running sums statistics. The data populations for each distribution are related approximately using each distribution's coefficient of variation.

Figure 2A:
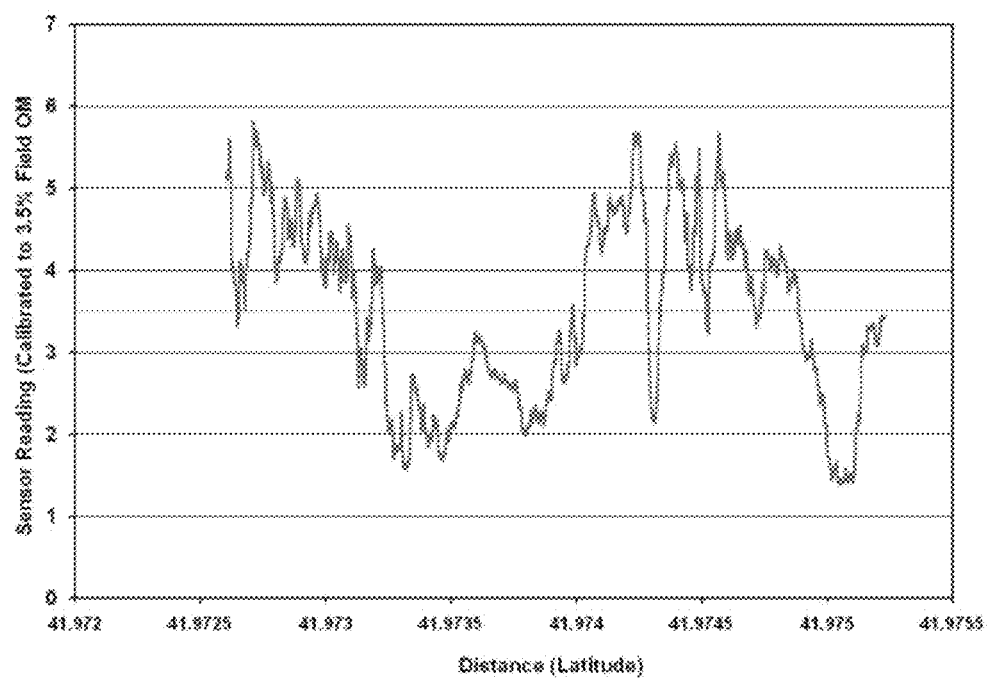
FIG. 2A-2E illustrates sensed and sampled field transect.
Figure 2B:
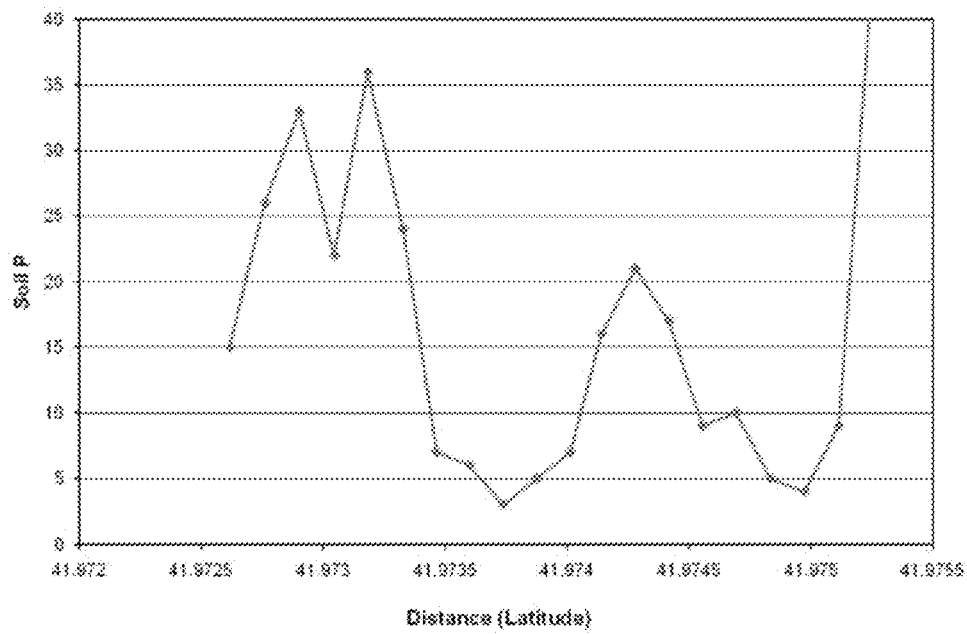
Figure 2C:
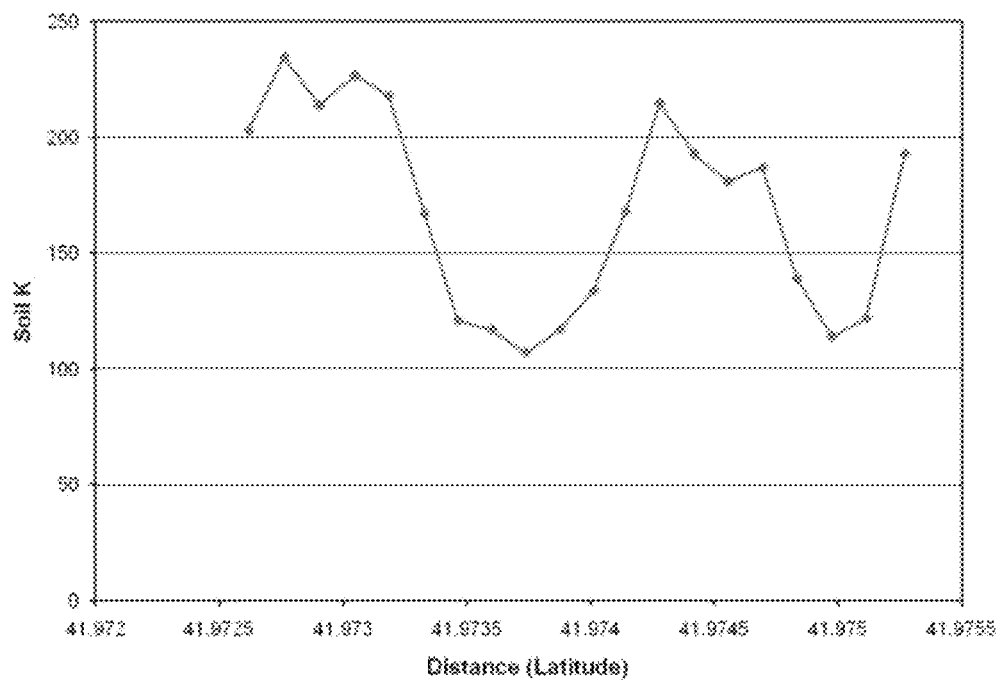
Figure 2D:
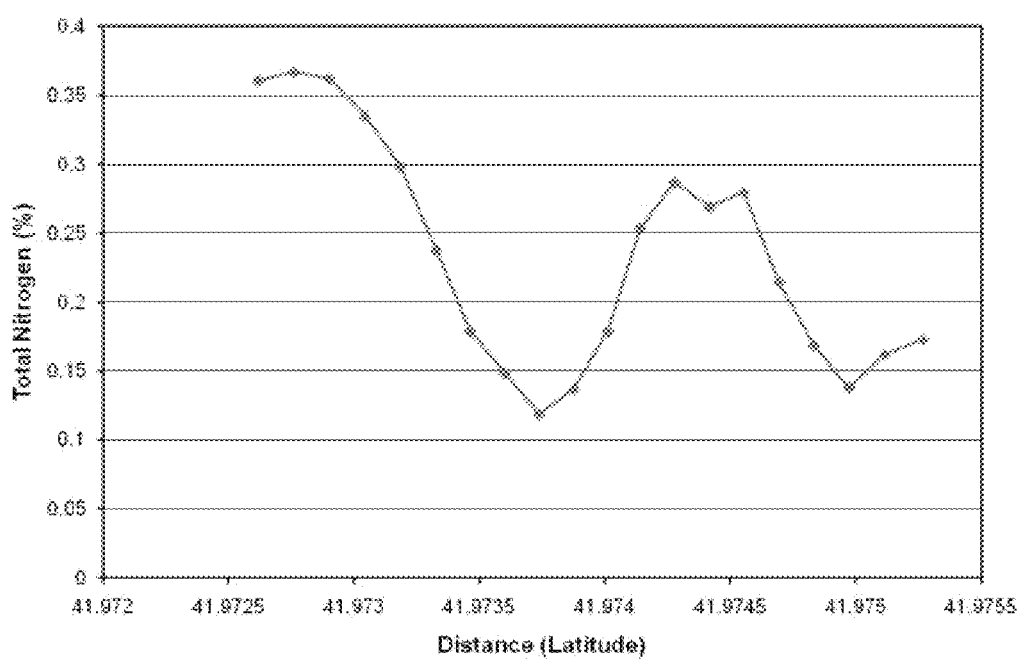
Figure 2E:
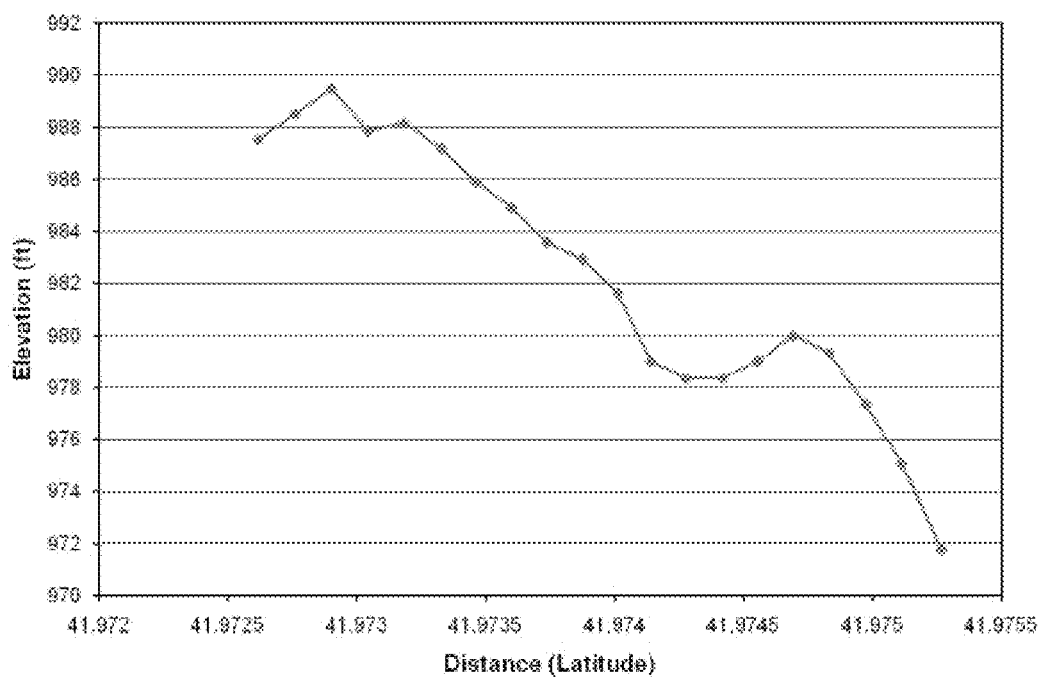
Figure 3:
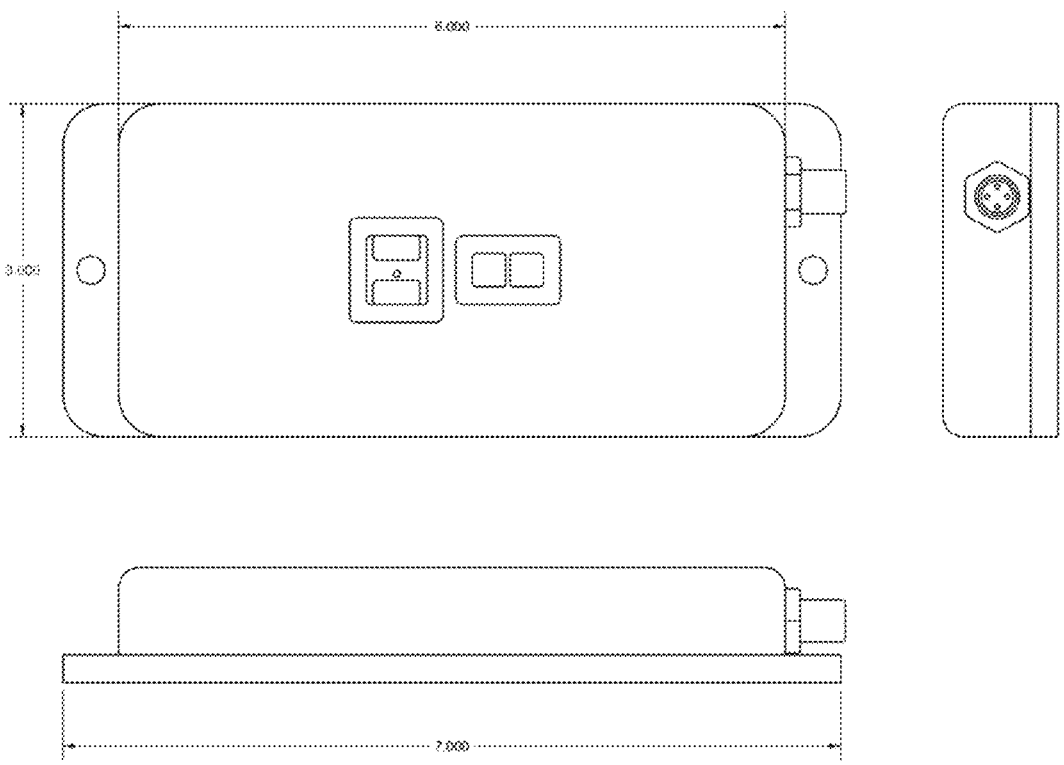
FIG. 3 illustrates one embodiment of a non-contact soil sensor. The instrument uses 2 wavebands; the spectral separation between the wavebands is typically greater than 200 nm.

Consider for example a soil color sensor such as the device depicted in FIG. 3. This particular soil sensing device can mount to a tractor, plow, planter or other agricultural implement or other type of vehicle. The sensor is capable of optically measuring variation in soil color while it is positioned above the soil. Other types of soil color sensors can be mounted in situ to measure the soil color under the soil surface. The sensor can measure soil color while in motion or when it is stationary. FIG. 2A shows sensor measurements obtained from the sensor across a typical field transect. FIG. 2B to FIG. 2E show manually sampled data along the soil transect measured by the sensor. As can be observed in FIG. 2A to FIG. 2E, hand sampled soil data have similar trends comparatively to the data produced by the sensor. The coefficient of variation (CV) for the sensor data distribution is:

$$CV_S = \frac{b \cdot m \cdot \sigma_S}{\mu_S}$$

where b is the correlation trend scalar {b=−1 for negative correlations; b=1 for positive correlations}, m is the regression scalar.

$\sigma_S$ is the standard deviation for the sensor data, and $\mu_S$ is the sensor mean data value.

Furthermore, the data from each distribution is also related by the following:

$$\frac{\delta_S}{\sigma_S} = \frac{\delta_F}{\sigma_F}$$

where the $\delta_S$ and $\delta_F$ are defined as $\delta_S = x_S - \mu_S$ and $\delta_F = x_F - \mu_F$.

In the case of a soil sensor, the unknown variable $x_S$ for the sensor distribution might be defined for soil reflectance data as:

$$x_S = \frac{1}{\rho_{\lambda 2} - \rho_{\lambda 1}}$$

however, variable $x_S$ may take on other mathematical forms for other types of sensors. For example, $x_S$ might be a(n) Normalized Difference Vegetation Index (NDVI), spectral reflectance or other vegetation index when using a crop sensor.

If we assume that the distributions are related and can be related via the CVs of each distribution then $CV_S \cong CV_F$ which yields the following when the standard deviation and means are substituted in for the CV for each data distribution:

$$\frac{b \cdot m \cdot \sigma_S}{\mu_S} = \frac{\sigma_F}{\mu_F}$$

where b is a correlation scalar (b=1 if positive correlation or b=−1 if negative correlation) and m is an intercept scalar (typically m is equal to 1).

Solving for the standard deviation of the filed in terms of sensor data results in:

$$\frac{\sigma_F}{\mu_F} = \frac{b \cdot m \cdot \sigma_S}{\mu_S} \Rightarrow \sigma_F = \frac{b \cdot m \cdot \sigma_S \cdot \mu_F}{\mu_S}$$

In the case of a soil sensor the field organic matter (OM) value is defined as the mean plus a delta to a point on the OM distribution curve. This can be parameterized in terms of sensor data via the synthesis:

$$OM = \mu_F + \delta_F$$

$$= \mu_F + \frac{\delta_S \cdot \sigma_F}{\sigma_S}$$

$$= \mu_F + \frac{\mu_F \cdot \delta_S \cdot b \cdot m}{\mu_S}$$

$$= \mu_F \left(1 + \frac{b \cdot m \cdot (x - \mu_S)}{\mu_S}\right)$$

The above relation can be utilized in various types of agrichemical or material application. One use might be for varying seed rate across a field based on relative organic matter distribution in a field. Another use maybe for varying herbicide application. Yet another application uses the OM term for soil fertilizer recommendations. This use is shown in the two following methods:

Method 1) N application method based on applying relative to the maximum rate:

$$N_{APP} = N_{REC} - g \cdot OM$$

where $N_{REC}$ is the recommended rate, OM is the soil organic matter, and g is the fertilizer sensitivity constant per percent of soil organic matter (g is typical 20 to 30 lbs N per percent of organic matter).

Method 2) N application method based applying around an average rate:

$$N_{APP} = N_{AVG} + g \cdot (\mu_F - OM)$$

where $N_{AVE}$ is the recommended average rate,

OM is the soil organic matter content, $\mu_F$ is the average field organic matter value (soil sampled via service provider), and g is the fertilizer sensitivity constant per percent of soil organic matter (g is typical 20 to 30 lbs N per percent of organic matter).

It should be noted that the above use of the field's average organic matter term is a proxy value in place of an actual sensor calibration. Using field or regional data can be useful in lieu of actual system calibration and can give agrochemical application systems considerable flexibility over a wide range of agricultural landscapes. The use of regional data enables the system to integrate years of agronomic science for immediate use circumventing years of costly testing and evaluation. In some circumstances, the use of field calibration data is not required and agrochemical application can be performed solely on the data distribution and statistical characteristics of real-time collected data.

It is to be understood that where regional data is used, adjustments may still be made. For example, applied agronomy and crop consultants may adjust regional recommendations for a particular field or sub-region. These adjustments may be made on additional data available to the consultants from the field or sub-region or relating to the field or sub-region.

Figure 4:
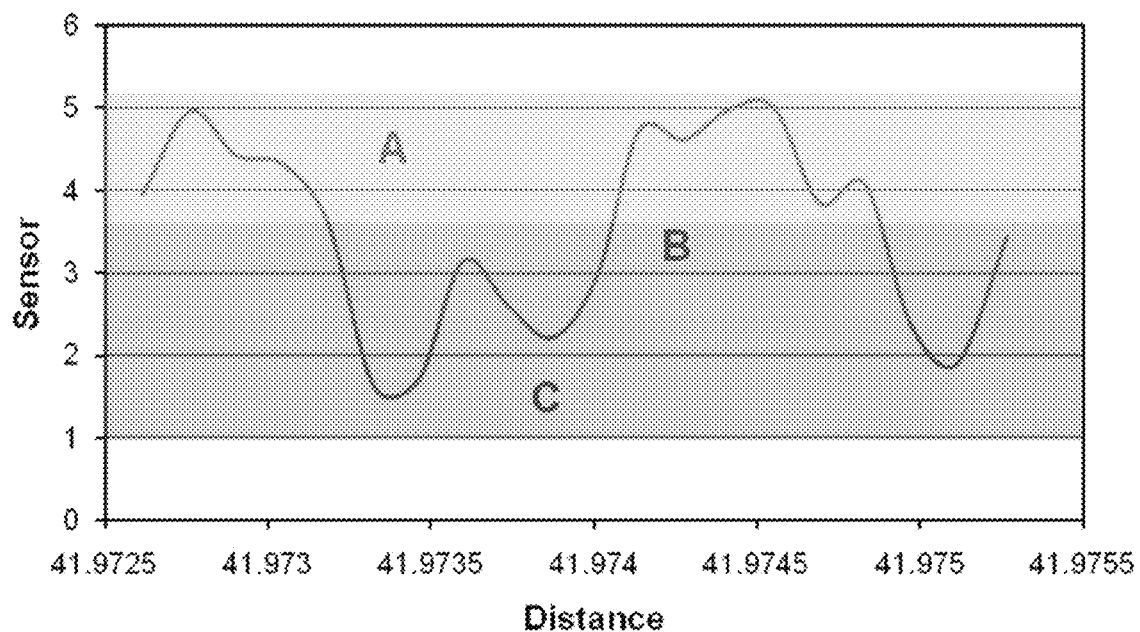
FIG. 4 illustrates sensor zone management. Each sensor zone depicted by zone labels A, B and C represents unique region of the field. These regions can be differentially treated based on a user defined (or system) rule set.

A useful embodiment pertains to the establishment of confidence limits to variably apply agrochemicals or other agricultural products like seeds to a field. Confidence limits for zones A, B and C as shown in FIG. 4 can be calculated in real-time using various statistical techniques. One method may include the use the sampled population's standard deviation. The boundary for the zone C may be calculated then from the following equation:

$$C_{Upper\ Limit} = \mu_S - n \times \sigma_S$$

where $C_{Upper\ Limit}$ is zone C's upper boundary,
$\mu_S$ is the mean of sampled sensor values,
n is a scalar and
$\sigma_S$ is the standard deviation of sampled sensor values.
Similarly, the lower boundary for zone A is calculated as follows:

$$A_{Lower\ Limit} = \mu_S - n \times \sigma_S$$

where $A_{Lower\ Limit}$ is zone C's upper boundary,
$\mu_S$ is the mean of sampled sensor values
n is a scalar and
$\sigma_S$ is the standard deviation of sampled sensor values.
Zone B is defined then as:

$$B = A_{Lower\ Limit} - C_{Upper\ Limit}$$

Another method of calculating zone limits involves the use the sampled histogram. Assuming that the percentage of samples for each zone A, B, and C should be represented by 34%, 32% and 34% of the sampled data, the boundaries can be calculated by converting the ordinary histogram to a cumulative histogram searching for the boundaries using the established limits. A normalized cumulative histogram is defined by $$A_n = \frac{1}{N} \sum_{i=1}^{n} h_i$$

where $A_n$ is the normalized cumulative value determined over n bins,
N is the number of sample points contained in the histogram and
$h_i$ is the $i^{th}$ bin.

It follows then, by applying the sample percentages above, the limits for each zone can be determined using the following algorithm follows:

```
float zone_rate(*int hptr, float Cul, float All, float N, float sensor_data)
{
  int Ai, Ci;
  float Cthrsh, Athrsh;
//Variable initialization
    //hptr is a pointer to the histogram array h[n]
    //Cul is the upper limit for zone C
    //All is the lower limit for zone A
    //sensor_data is the most recent real-time data point
    Ci=1; //bin ptr for zone C upper limit
    Ai=1; // bin ptr for zone A lower limit
//Find bin pointer for zone C
    acc=0; // cumulative value
    While ((float)(acc)/N <Cul)
    {
        acc=acc+*(hptr+Ci); //accumulate values in histogram
        array h(i) Ci++;
    }
//Find bin pointer for zone A
    Ai=Ci;
    While ((float)(acc)/N <All)
    {
        acc=acc+*(hptr+Ai); //accumulate values in histogram
        array h(i) Ai++;
    }
    Cthrsh=dh*(float)(Ci--); //Calculate C zone threshold for
```

```
            comparing real-time //data. Cthrsh is calculated
            by multiplying the bin ptr Ci by the //bin width (dh).
        Athrsh=dh*(float)(Ai--); //Calculate B zone threshold for
            comparing real-time //dat
        a. Athrsh is calculated by multiplying the bin ptr Ai by the
        bin width (dh).
        if (sensor_data<Cthrsh)
            return *zone_rate_C; //returns rate C pointed to by
            zone_rate_C ptr
        else if (sensor_data< Athrsh)
            return *zone_rate_B; //returns rate B pointed to by
            zone_rate_B ptr
        else
            return *zone_rate_A; //returns rate A pointed to by
            zone_rate_A ptr
}
```

In either case, application rate values for A, B and C can be set by the producer or crop consultant and entered into the producer's VRA or planter system. For example, consider an N fertilizer application. The average application value (B zones) is determined to be 50 lbs N per acre. It is further established that A zones will be decreased 40% to 30 lbs N per acre and C zones increased 20% to 60 lbs N per acre. In operation, when the sensor provides a value that is in above the A zone threshold, the control system would apply the A zone rate. Likewise, the system would apply the B zone rate when the sensor value is greater than the C zone threshold and less than the A zone threshold. And finally, when the sensor value is below the C zone threshold, the C zone rate is applied by the control system.

This approach can be adapted for use on early season crop nutrient stress sensing as opposed to traditional means of determining nutrient stress relies on nutrient accumulation deficits, for example N, at later growth stages. For sensor based N application, N is applied to the crop at later growth stages because it is only then that the N stress can be detected and correlated using traditional sensor calibration and algorithmic techniques. The standard method to calibrate the sensors is to establish a high N reference strip or high N region in a field. At the time of in-season N application, the producer will drive over this region in order to capture sensor measurements for this crop. Ideally, these measurements represent crops that are growing in non N limiting conditions. The remainder of the field is compared to these measurements. Through the use of an algorithm or application table of values, new sensor readings are compared to the reference values and N is applied in accordance to the algorithm or position in the application table. This method will work for corn at growth stages between V7 and V14 but will not work for early growth stages of V2 to V6 because N is not a limiting factor for the plants growth. At early growth stages, other factors will affect the growth and will cause variation in collected sensor measurements. It is these factors (soil type, soil temperature, soil organic matter, field landscape and topology, drainage, etc.) that will not only affect the growth at an early development stage but will impact the plant's growth at later growth stages, that is, it is these influences that will cause a need for N application at later growth stages. Another limitation for some producers with respect to applying in-season N fertilizer is that the timing window for application is too narrow. Climate factors (heavy precipitation) may prevent the producer from entering his fields and applying N fertilizer at the proper time. Other producers are limited to early in-season application due to the fact they may not have access to or own high clearance application rigs that can enter their fields at later growth stages when the crop, typically corn, is very tall.

As such, being able to apply N to the crops at an early growth stage V2 to V6 would be advantageous because it would extend the application window and allow producers with pull-type or drawn fertilizer equipment to access the fields when the crop stand is shorter. It should be noted, that this new application technique could also be used at later growth stages or with the traditional producer-created high N reference strip. Current methods of determining the optimum calibration value within a reference strip have had varied amounts of success. Use of this methodology of the present invention provides a robust and deterministic way to extract the calibration value from high reference regions or strips in a field at later growth stages when using optical crop sensing technology.

Figure 10:
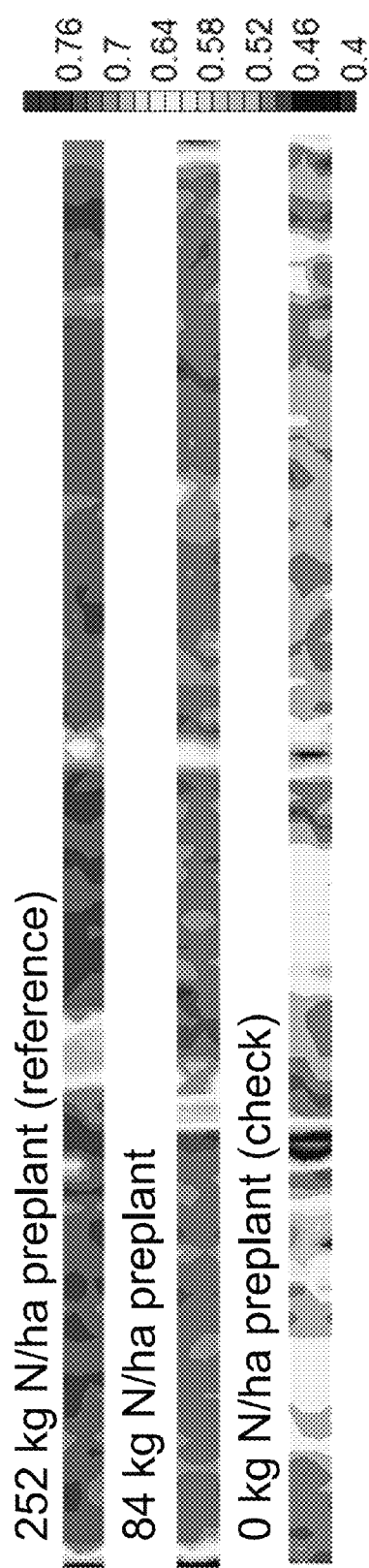
FIG. 10 illustrates amber NDVI values from active crop canopy sensor on at V10 growth stage for three adjacent 12-row corn strips receiving 0, 84, or 252 kg N/ha shortly before planting.

Another use for the invention pertains to scanning a traditional high N reference strip. FIG. 10 shows scans of field strips with 0, 84 and 252 kg N/ha of applied N. The 252 kg N/ha strip is a traditional high N reference strip. Note the variability along the length of this reference strip. In theory, this strip would be uniform and would represent the N sufficient portion of the field in which to calibrate the sensing system but in reality, though, this is not the case particularly when the field has received excessive amounts of rain fall. When precipitation is high, N leaches or runs-off the field and when precipitation is excessive, denitrification can occur and the N in the soil can volatize. In any case, the reference strip or region becomes increasingly non uniform. Many sensor calibration approaches, when using the traditional high N reference strip, involve scanning the reference strip to measure the strip's average vegetation index value or to measure a region (or portion of the strip) that has a high peak value for a certain length of time, for example, 3 to 4 seconds. These approaches will result in creating a calibration point that is under the optimal calibration point particularly when the reference strip has been damaged due to excessive precipitation. The invention as disclosed allows the user to create more robust calibration data via the real time statistical analysis methods presented above via statistical analysis of the collected data distribution of the reference strip.

This embodiment makes use of the real-time collected data by analyzing the distribution for its mean and maximum values ($\xi$) or a point near the maximum but higher than the mean. Note, this data can be collected before the N application operation, for example, from a previous trip through the field or from an aerial or satellite image and the data processed and saved as an N application map for spray applicator equipped with variable rate application system. The maximum point can be computed through the use of a cumulative histogram to find a particular limit value, for example the 95 percentile point, or some fractional multiple of the standard deviation, $n \cdot \sigma$ where n can typically vary from 0 to 3. After the maximum bound is determined, the minimum bound ($\eta$) it determined by subtracting the difference between the maximum and the mean from the mean or, $2 \cdot \mu - \xi$. Therefore, the agrochemical application equation is as follows:

$$N_{APP} = \begin{cases} \text{if } x \pounds \mu, \text{ then } N_{AVG} - \dfrac{N_{RECA} \times (x - \mu)}{|\mu - \eta|} \\ \text{if } x > \mu, \text{ then } N_{AVG} - \dfrac{N_{RECB} \times (x - \mu)}{|\mu - \xi|} \end{cases}$$

where $N_{APP}$ is the applied N rate,
  x is the current real-time sensor value,
  $\mu$ is the average of sensor values,
  $\eta$ is the lower bound of sensor values, ξ is the upper bound of sensor values,
$N_{AVG}$ is the recommended regional average application rate,
$N_{RECA}$ is N rate to apply in excess to the average rate down to bound η and
$N_{RECB}$ is N rate to remove from the average rate up to bound ξ.

Figure 5:
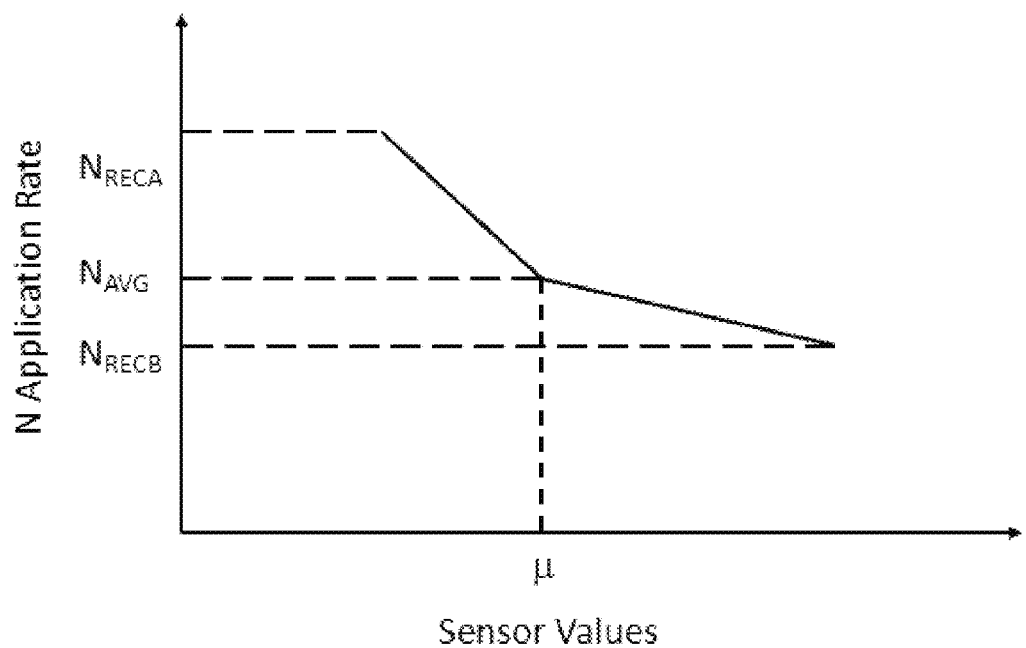
FIG. 5 illustrates early season N application method. The applied N rate is decreased for sensor values greater than $\mu$ and increased for sensor values greater than $\mu$.

In the equation above, suppose that $N_{AVG}$=80, $N_{RECA}$=70, $N_{RECB}$=50. The response curve for this situation with a mean sensor value μ is shown in FIG. 5. Here we see that the applied N rate increases (applying more N to N deficient plants) as the real-time sensor value x tends toward the lower bound and decreases applied N (applying less N to N sufficient plants) as the real-time sensor value tends toward the upper bound. Note, the application trends can be reversed or the trends can be set to move in the same direction. The above example uses simple linear relationships; however, more sophisticated functionalities can be implemented instead. Furthermore, a dead zone can be established around the mean to apply only the average rate. When the sensor values extend past this bound, N can be varied according to the equation above or other function or rule set.

Another method for determining early season nutrient needs for corn (V2-V7) and other crops also uses a sampled data distribution in conjunction with an N application equation (or algorithm) such as the following N fertilizer application equation developed by Holland and Schepers (2010):

$$N_{APP} = (N_{OPT} - N_{PreFret} - N_{OM}) \cdot \sqrt{\frac{(1-SI)}{\Delta SI \cdot (1 + 0.1 \cdot e^{m \cdot (SI_{Threshold} - SI)})}}$$

where, $N_{OPT}$ is the EONR or the maximum N rate prescribed by producers,
$N_{PreFert}$ is the sum of fertilizer N applied prior to crop sensing and/or in-season N application,
$N_{\overline{OM}}$ is the N credit for the field's average organic matter content,
SI is the sufficiency index,
ΔSI is the sufficiency index difference parameter,
m is the back-off rate variable (0<m<100) and
$SI_{Threshold}$ is the back-off cut-on point.

Figure 6:
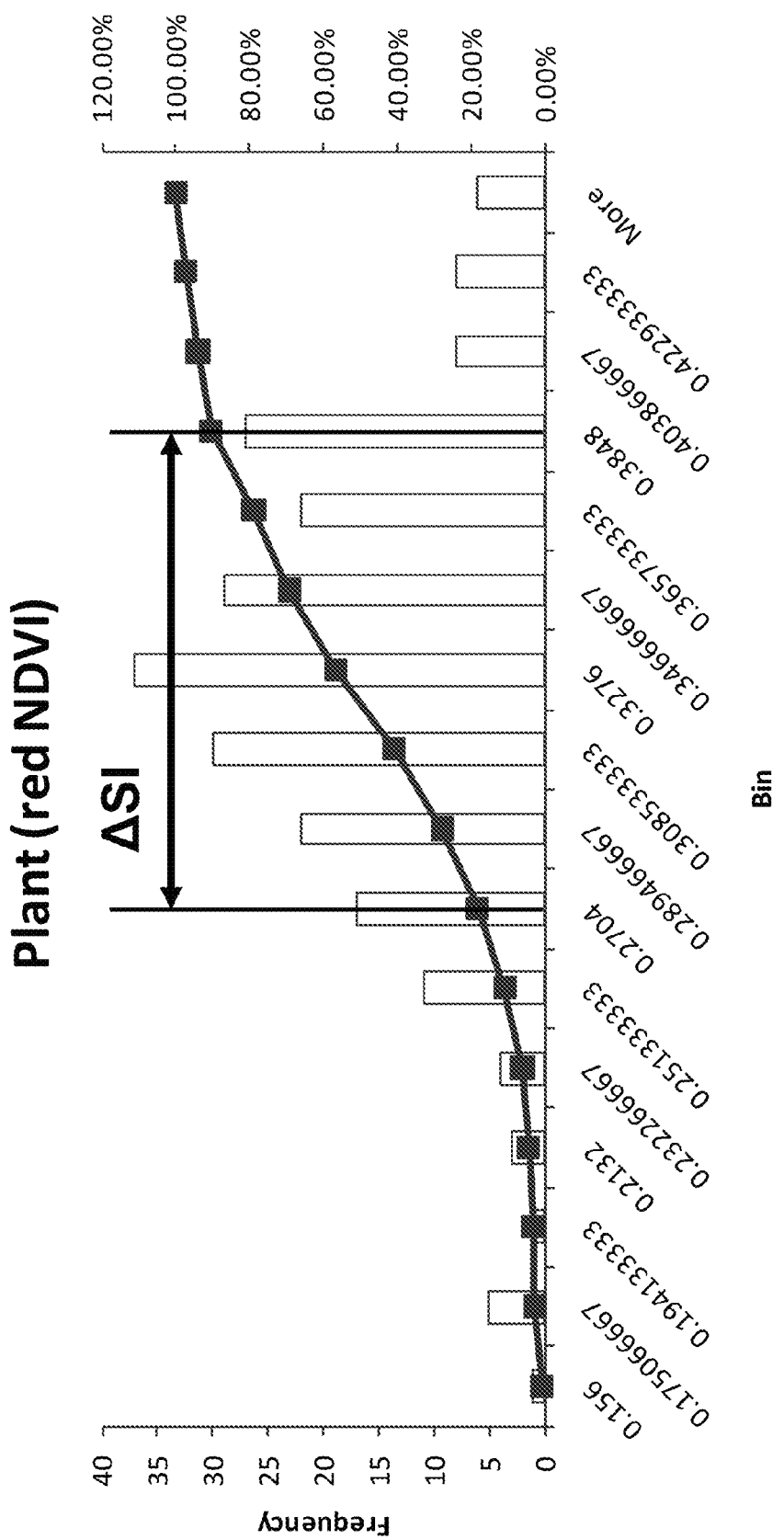
FIG. 6 illustrates sampled distribution of V3 corn (Mexico). Upper and lower calibration points for $\Delta$SI are illustrated on histogram.

To use the above N application model, the ΔSI parameter is determined explicitly from the sampled data. Note, sometimes the ΔSI term is known from previous data collection and can be hardcoded into the N application equation. The histogram of sampled data is analyzed to determine the upper and lower calibration points. The calibration points are shown graphically in FIG. 6. In FIG. 6, ΔSI is also denoted over the range of vegetation index values that is covered by the calibration. A cumulative histogram is utilized to search for these calibration points. A normalized cumulative histogram is defined by $$A_n = \frac{1}{N} \sum_{i=1}^{n} h_i$$

where $A_n$ is the normalized cumulative value determined over n bins,
N is the number of sample points contained in the histogram and
$h_i$ is the $i^{th}$ bin.

Each calibration point is easily determined from real-time sensor data using either individual or composite cumulative histogram searches. The cumulative histograms to search for the lower and the upper calibration points are $$A_{lower} = \frac{1}{N} \sum_{i=1}^{n} h_i \text{ and } A_{upper} = \frac{1}{N} \sum_{i=1}^{n} h_i$$

The difference between N sufficient crops having an SI equal to 1 and the ratio of the calibration points represents the ΔSI value as shown in the equation below.

$$\Delta SI = 1 - \frac{A_{lower}}{A_{upper}} = 1 - \frac{\frac{1}{N}\sum_{i=1}^{n} h_i}{\frac{1}{N}\sum_{i=1}^{m} h_i} = 1 - \frac{\sum_{i=1}^{n} h_i}{\sum_{i=1}^{m} h_i}$$

For example, if it is determined that the lower calibration point represents 20% of the occurrences in the histogram and the upper calibration point represents 95% of the occurrences in the histogram, then ΔSI can be calculated as using the following composite histogram algorithm:

```
float find_deltaSI(*int hptr, float lcal, float hcal, float N)
{
  int acc, li, hi;
  float H, L;
//Variable initialization
    //hptr is a pointer to the histogram array h[n]
    //lcal is the lower calibration point (lcal has value 0.2
    passed to it)
    //hcal is the upper calibration point (hcal has value 0.95
    passed to it)
    //sensor_data is the most recent real-time data point
    li=1; //bin ptr for lower calibration point
    hi=1; // bin ptr for upper calibration
//Find bin pointer for lower calibration point
    acc=0; // cumulative value
    While ((float)(acc)/N < lcal)
    {
        acc=acc+*(hptr+li); //accumulate values in histogram
        array h(i) li++;
    }
//Find bin pointer upper calibration point
    hi=li;
    While ((float)(acc)/N <hcal)
    {
        acc=acc+*(hptr+hi); //accumulate values in histogram
        array h(i) hi++;
    }
    H=dh*(float)(hi--); //Calculate calibration value for computing
           deltaSI //from realtime data. H is calculated by
           multiplying the bin ptr   //hi by the bin width (dh)
           from realtime data.
    L=dh*(float)(li--); // Calculate calibration value for computing
           deltaSI from //realtime data. Ll is calculated by
           multiplying the bin ptr li by //the bin width (dh).
    return (1−L/H); //return delta SI to the calling procedure
}
```

A consequence of precision agriculture technologies using the embodiment disclosed above pertains to incorporating these methods into best management practices (BMP) for agricultural material usage, in particular, embedding knowledge-of-use into materials that may be managed by the VRT systems. For example, consider a variable rate seeding application that uses zone management practices (real-time or map based). It may be difficult for the producer to fully take advantage of the particular seed genetics if certain management practices (seed rate, planting time, optimal fertilizer quantities and type, etc.) are not implemented. In this case, the bag of seed might have a barcode or RFID tag that might contain the BMP information for the VRT system. This information can be readily scanned or entered into the VRT system to automatically configure the seeder to optimally vary planting depth, seed rate, fertilizer rates, etc. This concept can also be extended to agrochemical application as well. Information provided by the manufacturer and imprinted on the material's packaging (barcode or code constants), asset specific memory integrated circuit such as the iButton memory circuit manufactured by Maxim (Sunnyvale, Calif.) or RFID tag can be scanned or loaded manually into the VRT system enabling the producer to optimally use the agrochemical without the need to manually configure the system. The information provided by the codes on the packaging may be utilized by the system to set up optimal control VRT system parameters. The use of such a system may assist in reducing the burden on the producer to implement the agricultural product manufacturer's recommendations. Note, the default configurations as provided by the agricultural product's barcode or RFID can be user modified by changing the settings loaded into the VRT controller. The BMP information may also include proprietary information of a chemical or seed company where proprietary information is used to determine best management practices, the proprietary information may be hidden from a user of the system. Thus, the producer can benefit from the proprietary information without the chemical or seed company needing to disclose the proprietary information to the producer. Furthermore, BMP information can be supplied to the VRT system via database as either a file or an ECU (electronic control module). The module may connect directly to real-time sensors and to the VRT system (as a bridge module) via the VRT system's control bus or to the VRT system via the system's control bus or expansion port independent of the real-time sensor equipment. The control bus can be a CAN bus, serial bus, multi-drop bus, dedicated expansion port, Ethernet bus, etc. Some embodiments may be as simple as a database file containing the manufacturer's BMP's that is loaded into a central user console in the tractor cab. In this embodiment, a seed company or agrochemical company could supply to customers a module that contains region specific BMP's for their product in order to maximize said product's performance in a particular region. For example, seed rates for a corn hybrid (or other crop) could be modified depending on the customer's particular soil type or climate. This type of system could be useful in taking advantage of a seed company's germplasm having particularly advantageous genetics for a given region (water stress resistance, nitrogen use efficiency, etc.). Access to the BMP recommendation in the ECU module's database for a particular agricultural material can be determined in conjunction with the aforementioned methods or via internet or cellular interface hence making it transparent to the user. The ECU module can also incorporate various mathematical modules, decision aids and statistical methods to best use BMP information. The ECU can provide BMP information to the VRT system when used in conjunction with real-time sensing equipment or without such equipment.

Figure 7:
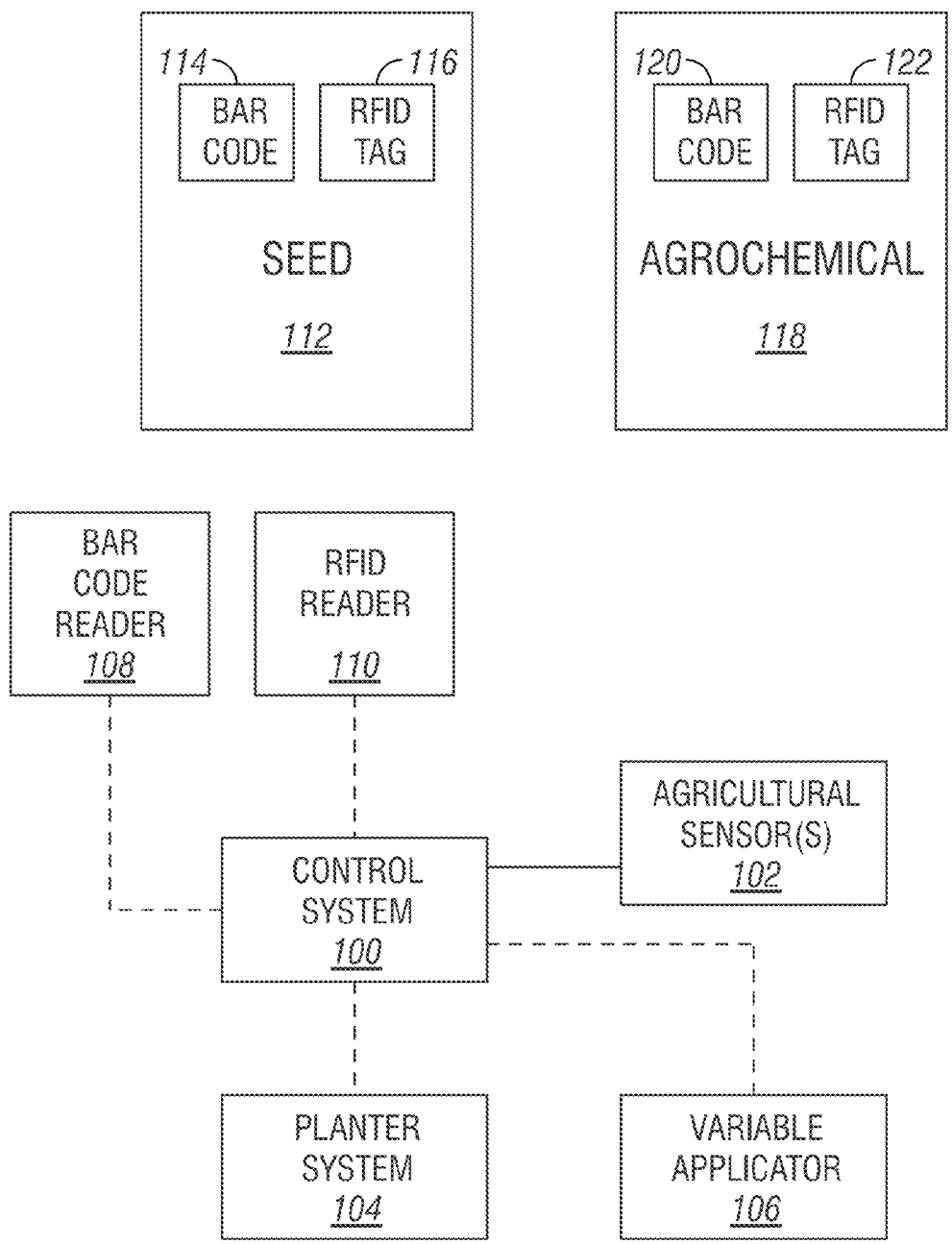
FIG. 7 illustrates one example of bar codes or tags on a bag which include information used in applying agrochemicals.

FIG. 7 illustrates an example where bar code or RFID information may be used. In FIG. 7, a control system 100 is shown which is operatively connected to one or more agricultural sensors 102. The control system 100 is also operatively connected to a system for applying agricultural products such as a planter system 104 or a variable applicator 106. The control system 100 is also in operative communication with a bar code reader 108 or RFID reader 110. A container such as a bag of seed 112 is shown which may include a bar code 114 and/or an RFID tag 116. The bar code is preferably a two-dimensional bar code. Similarly, a container of agrochemical 118 may also include a bar code 120 and/or an RFID tag 122. The bar codes may be read by the bar code reader 108 and information obtained therefrom may then be communicated to the control system 100 either manually or automatically. Similarly, the RFID tags may be read by the RFID reader 110 and information obtained therefrom may then be communicated to the control system 100. Information communicated may include best management practices information associated with the seed or agrochemical.

Figure 8:
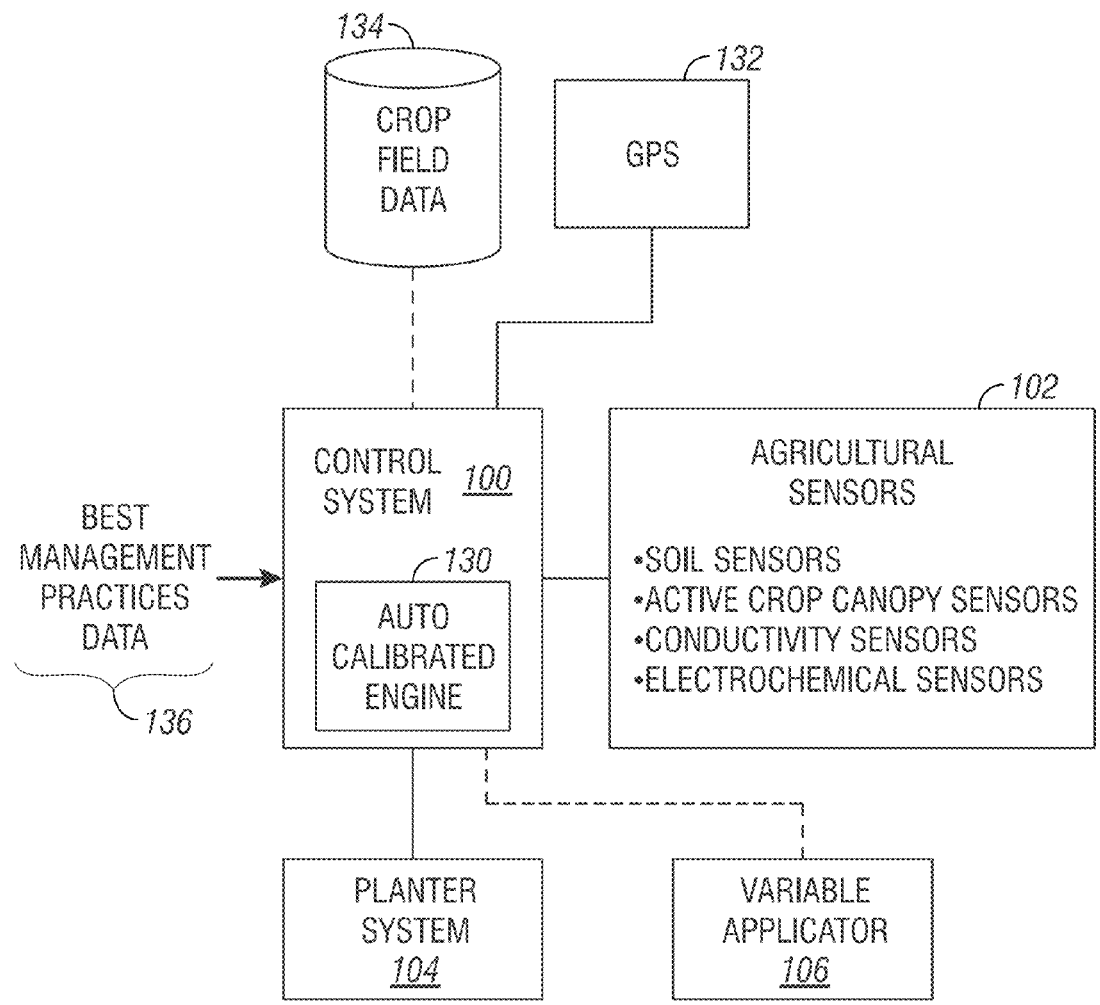
FIG. 8 illustrates another example of a system of the present invention.

FIG. 8 illustrates another example of the present invention. As shown in FIG. 8, the control system 100 is shown. The control system may include a microcontroller, microprocessor other type of intelligent control. The control system may be programmed or otherwise configured to perform the various methodologies described herein for determining the variable rates of application of agricultural products. Where the control system is programmed, instruction sets for performing various steps of the methodologies may be stored on a non-transitory computer readable storage medium or may be otherwise stored. The control system 100 may include an auto-calibration engine 130 as shown which uses histogram techniques or other statistical techniques to auto-calibrate values acquired by the agricultural sensors 102 to rates of application. In addition to this information, the control system 100 may also take into account best management practices data 136 associated with the agricultural products being used, the equipment being used, the field, or otherwise. In addition, the control system 100 can take into account crop/field data 134 which may include remote sensing data. A GPS 132 is shown which may be used to determine location which may be correlated with crop/field data 134 and/or best management practices data 136 and used by the control system 100.

Figure 9:
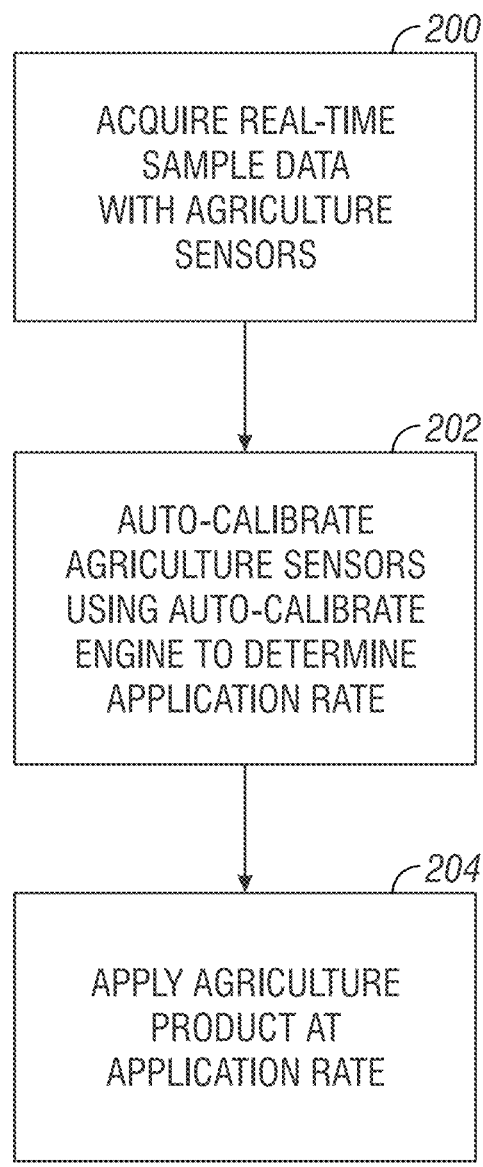
FIG. 9 illustrates another embodiment of a methodology of the present invention.

FIG. 9 illustrates an example of a methodology of the present invention. In step 200, real-time sampled data is acquired with agricultural sensors. In step 202 auto-calibration of the agricultural sensors is performed such as by using an auto-calibration engine to determine application rate. In step 204, agricultural products such as seed or agrochemicals are applied at the application rate. Thus, in this manner, the methodology allows for auto-calibration of the agricultural sensors.

Figure 11:
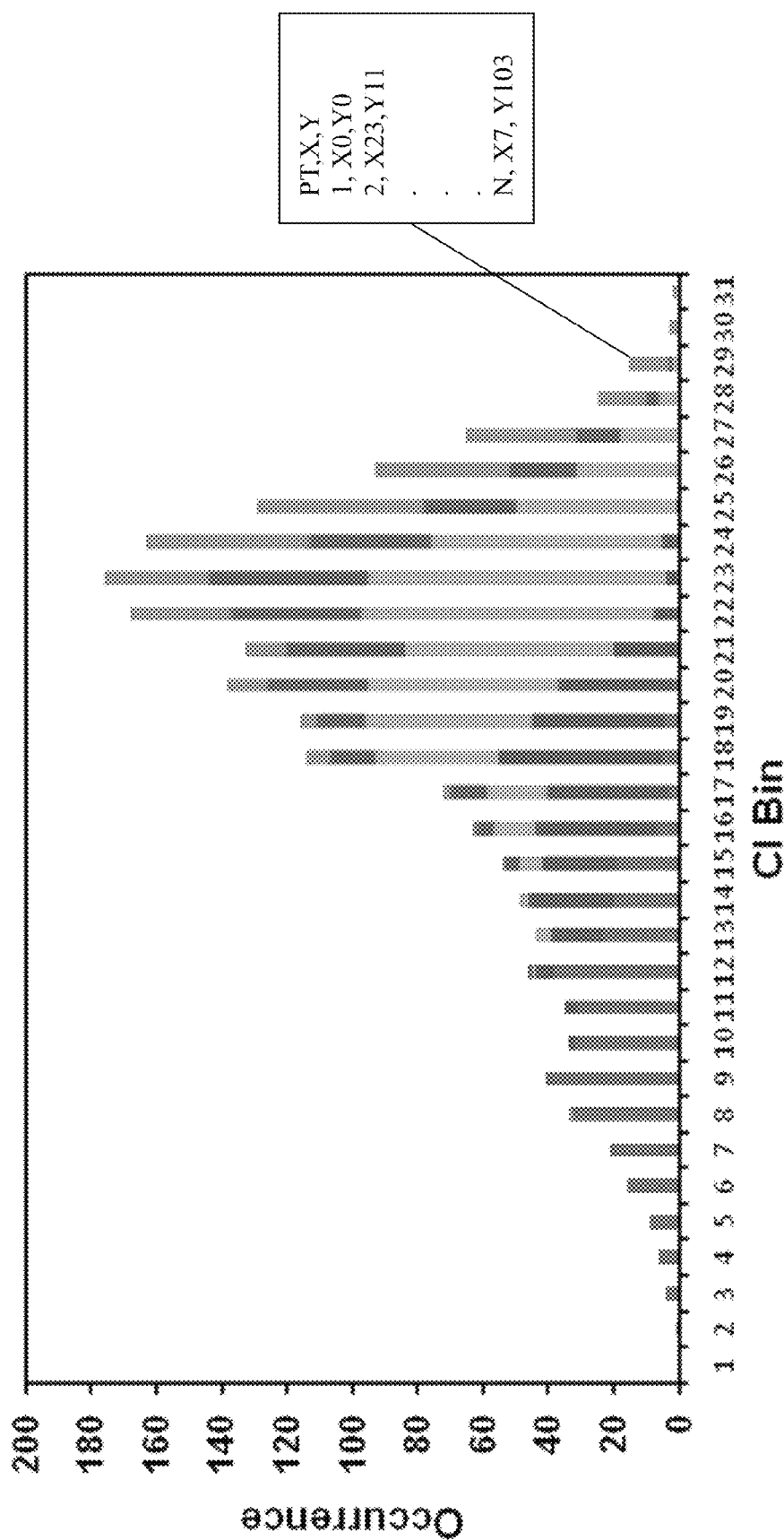
FIG. 11 illustrates an experiment study with 5 chemical treatments. Histogram bin 29 is opened to show sample points at spatial locations within experimental study plots. Positions for each bin can be scouted by technicians to collect soil, leaf tissue and seed samples.

Another application of the invention involves breeding and trait discovery for seed production. By tagging each data point in the collected histogram or data distribution with a physical location (x, y or even z for elevation) within the a seed producer/breeder's production plots, the location within the plots can be scouted after data collection to search out plants that are growing with exception vigor with respect to the experimental treatment. This is done simply by analyzing data within bin positions that exhibit a particular value of interest, see FIG. 11. In FIG. 11, bin 29 is opened to show spatial locations for plants having a particular characteristic, in this case the bin locations contain chlorophyll index (CI) values logged from a Crop Circle ACS 470 active crop sensor (Holland Scientific, Lincoln, Nebr.). Position can be determined using a GPS or other spatial or distance determination means. The treatment could be an imposed water, nutrient or chemical (herbicide for example) stress. The plants that perform the best may have certain expressed genetic traits that can be selected for use in a plant breeding program to create varieties of the plant that perform well under a particular stress.

Although various embodiments and examples have been described throughout, the present invention contemplates numerous variations and modifications. These include different types of agricultural products, different types of agricultural sensors, using different types of statistical methodologies to determine application values, using different types of data not sensed with the agricultural sensors such as remote sensing data, field or regional data, and best management practices data, and other data that may be available. The present invention is not to be limited to the specific examples and embodiments described.

What is claimed is:

1. A method for application of an agricultural product to a field, the method comprising:
   acquiring real-time sampled data using real-time agricultural sensors;
   auto-calibrating the real-time agricultural sensors using statistical characteristics of the real-time sampled data to determine an application rate; and
   applying the agricultural product to the field based on the application rate.

2. The method of claim 1 further comprising determining a set of application rates wherein the application rate is within the set of the application rates and the step of auto-calibrating provides for selection of the application rate from the set of the application rates.

3. The method of claim 2 wherein the agricultural product comprises an agrochemical and the set of application rates are user-specified into a variable rate applicator.

4. The method of claim 2 wherein the agricultural product is seed and the set of application rates are user-specified into a planter system.

5. The method of claim 1 wherein the step of auto-calibrating is performed using information associated with packaging of seed or agrochemicals.

6. The method of claim 5 wherein the information associated with the packaging of seed or agrochemicals is encoded on one or more bar codes of the packaging.

7. The method of claim 5 wherein the information associated with the packaging of seed or agrochemicals is encoded in one or more radio frequency identification (RFID) tags of the packaging.

8. The method of claim 5 wherein the information associated with packaging of seed or agrochemicals comprises best management practices.

9. The method of claim 1 wherein the step of auto-calibrating the real-time agricultural sensors using the statistical characteristics of the real-time sampled data to determine the application rate comprises:
   analyzing a distribution of the real-time sampled to determine a mean and a value proximate a maximum value;
   calculating a minimum value from the mean and the value proximate the maximum value;
   using the minimum value, the mean, and the value proximate the maximum value to determine the application rate.

10. The method of claim 1 wherein the step of auto-calibrating the real-time agricultural sensors using statistical characteristics uses a histogram method.

11. The method of claim 1 wherein the step of auto-calibrating the real-time agricultural sensors using statistical characteristics comprises using regional data.

12. The method of claim 1 wherein the step of auto-calibrating the real-time agricultural sensors using statistical characteristics comprises using field data.

13. An apparatus for application of an agricultural product to a field, the apparatus comprising:
   a plurality of real-time agricultural sensors;
   a control unit in operative communication with the plurality of real-time agricultural sensors, the control unit configured to perform steps of (a) acquiring real-time sampled data using the real-time agricultural sensors, (b) auto-calibrating the real-time agricultural sensors using statistical characteristics of the real-time sampled data to determine an application rate, and (c) applying the agricultural product to the field based on the application rate.

14. The apparatus of claim 13 wherein the apparatus is further configured for determining a set of application rates wherein the application rate is within the set of the application rates and the step of auto-calibrating provides for selection of the application rate from the set of the application rates.

15. The apparatus of claim 14 wherein the agricultural product comprises an agrochemical and the set of application rates are user-specified into a variable rate applicator operatively connected to the control unit.

16. The apparatus of claim 14 wherein the agricultural product is seed and the set of application rates are user-specified into a planter system operatively connected to the control unit.

17. The apparatus of claim 13 wherein the step of auto-calibrating is performed using information associated with packaging of seed or agrochemicals.

18. The apparatus of claim 17 wherein the information associated with the packaging of seed or agrochemicals is encoded on one or more bar codes of the packaging.

19. The apparatus of claim 17 wherein the information associated with the packaging of seed or agrochemicals is encoded in one or more radio frequency identification (RFID) tags of the packaging.

20. The apparatus of claim 17 wherein the information associated with packaging of seed or agrochemicals further comprises best management practices information.

21. The apparatus of claim 13 wherein the step of auto-calibrating the real-time agricultural sensors using the statistical characteristics of the real-time sampled data to determine the application rate comprises:
   analyzing a distribution of the real-time sampled to determine a mean and a value proximate a maximum value;
   calculating a minimum value from the mean and the value proximate the maximum value;
   using the minimum value, the mean, and the value proximate the maximum value to determine the application rate.

22. The apparatus of claim 13 wherein the step of auto-calibrating the real-time agricultural sensors using statistical characteristics uses a histogram method.

23. A method, comprising:
   acquiring real-time sample data with agriculture sensors;
   auto-calibrating the agriculture sensors using an auto-calibrate engine to determine an application rate;
   applying agricultural product at the application rate;
   maintaining location data associated with the real-time sample data and application rate data;
   identifying locations in which plants exhibit characteristics of interest after application of the agricultural product.

24. The method of claim 23 further comprising using the plants in a plant breeding program.

25. A method, comprising:
   acquiring sample data with agriculture sensors traveling through a field, the sample data having location data associated therewith;
   analyzing the sample data using statistical characteristics to determine plants within the field having characteristics of interest.

26. The method of claim 25 wherein the characteristics of interest are associated with vegetation index values of interest.

27. The method of claim 25 wherein the step of analyzing the sample data using statistical characteristics uses a histogram method.

\* \* \* \* \*